O. WYMAN.
Grain Mill.

No. 531.                                   Patented Dec. 20, 1837.

UNITED STATES PATENT OFFICE.

OLIVER WYMAN, OF EAST CAMBRIDGE, MASSACHUSETTS.

MACHINE FOR GRINDING GRAIN.

Specification of Letters Patent No. 531, dated December 20, 1837.

*To all whom it may concern:*

Be it known that I, OLIVER WYMAN, of East Cambridge, in the county of Middlesex and State of Massachusetts, have invented a new and useful Improvement on My Machine for Grinding Grain and other Substances, patented July 1, 1836, which is described as follows, reference being had to the annexed drawings of the same, making part of this specification.

This machine generally resembles my patented machine, but the bridge-tree is placed above the runner. The improvement mainly consists in suspending the runner to the bridge-tree above the grinding stones in such a manner that it shall hang loosely from a point directly over its center and thus be enabled to accommodate itself to the bed stone for correct and even grinding without the necessity of setting it by screws.

Figure 1:
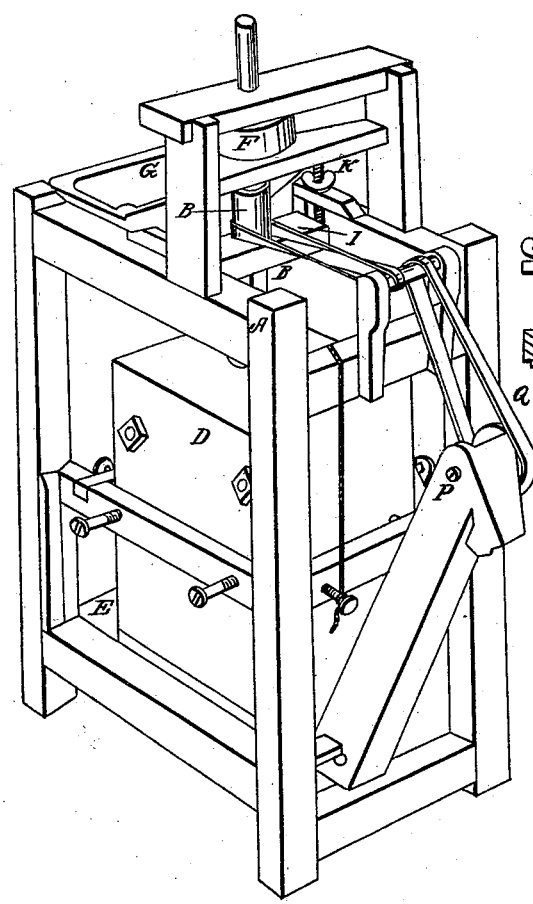
Figure 2:
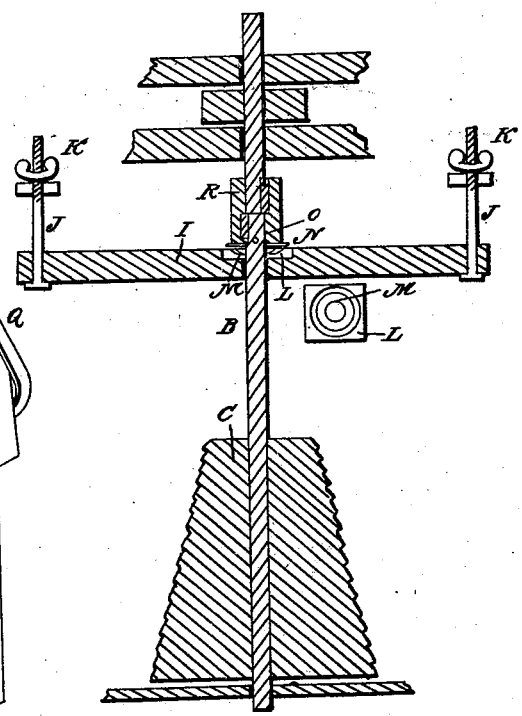

A, represents the frame; B, the spindle; C, the runner; D, the bed; E, platform; F, driving pulley; G, hopper; I, the bridge-tree from which the runner is suspended. This bridge-tree is raised or lowered by means of two screw rods J, J, Figs. 1 and 2, passing through it and through girts of the frame, said screw rods being raised or lowered with the bridge-tree by means of screws cut on the upper ends of said rods on which are screwed nuts or taps K, K, which rest on plates on the upper side of the girts—by turning which nuts the bridge-tree with the runner may be raised or lowered as desired so as to bring the runner nearer to, or recede it further from the bed for coarser or finer grinding—or for adjusting the runner to the bed in the most exact manner—the runner hanging in a true vertical position exactly in the center of the bed, from a point in the center of the spindle by which it can play loosely and freely and accommodate itself to the bed in case the grain enters between the stones in uneven quantities. This cannot be done in my former mill by the under bridge-tree and horizontal screws, as I have proved from experience.

A suspension of the runner to the spindle is effected in the following manner. A ring L, Figs. 2 and 3, with a concavity around its upper inner edge to receive oil, is placed around the spindle, resting on the upper side of the bridge-tree. Another ring M, whose under side is made convex is also placed around the spindle in the concavity of the first mentioned ring. A key N, is then passed through a slot in the spindle and rests upon the upper or last mentioned ring. A pin O is then passed through the spindle which rests upon the upper side of the key at a point in the center of the spindle. The pin is fixed and the key is loose. The spindle may have a slight movement over the key if necessary, by means of the slot in the spindle in which the key is placed. P, elevator for elevating the flour or meal. Q, band for turning the elevators. R, coupling of the spindle and shaft. The driving pulley is on this shaft.

Besides the before mentioned advantage of being able to adjust the runner to the bed with very little trouble for correct and even grinding, much friction is also reduced, and consequently the mill will do more grinding with less power than with the old mill.

The invention claimed by me the said OLIVER WYMAN, and which I desire to secure by Letters Patent consists in—

Suspending the runner of my patented mill from a bridge-tree above the bed-stone by means of the before described combination and arrangement of rings, key, and pin by which the runner can accommodate itself to the bed in the most exact manner, without the aid of a lower bridge-tree, step, and screws or wedges—as in the old mill.

OLIVER WYMAN.

Witnesses:
WM. P. ELLIOT,
J. B. WOOD.